Patented Sept. 9, 1947

2,427,071

UNITED STATES PATENT OFFICE

2,427,071

VULCANIZATION OF VINYL RESINS

Louis F. Reuter, Akron, Ohio, assignor to The B. F. Goodrich Company, New York, N. Y., a corporation of New York No Drawing. Application February 11, 1944, Serial No. 521,973

10 Claims. (Cl. 260—88)

This invention relates to the vulcanization of vinyl resins and pertains more specifically to the vulcanization of such resins in the presence of certain modifying agents which produce compositions having greatly improved properties.

As is well-known, various polymers of the halogenated ethylenes may be plasticized with certain plasticizers to give rubbery plastic products possessing properties which render them valuable as substitutes for rubber. They also have certain properties which render them superior to rubber for many uses. Among the polymers which have been thus employed are those made from vinyl chloride, vinylidene chloride, vinyl bromide, vinylidene bromide and mixtures of these monomers with one another, as well as with lesser proportions of other copolymerizable monomers such as vinyl acetate, vinyl propionate, vinyl butyrate, methyl acrylate, methyl methacrylate, ethyl acrylate, methyl ethacrylate, and other similar materials. One of the outstanding properties of these plasticized polymeric compositions is that they are permanently thermoplastic, that is, that they may be repeatedly softened by heating to a temperature well above room temperature. It is also known that the thermoplasticity of these polymeric compositions may be greatly reduced or completely eliminated by heating the composition with a small amount of a basic nitrogen-containing organic compound. Because this reduction of thermoplasticity is analogous with the change which occurs in rubber when it is vulcanized, the process has been termed vulcanization, and the materials employed have been termed vulcanizing agents. Such vulcanizing agents have been disclosed by Alexander, U. S. Patent 2,117,591 issued May 17, 1938, and in my copending applications, Serial Nos. 506,268; 506,-269; 506,270 and 506,271, filed October 14, 1943. It is pointed out in these cases that from 0.5 to 10% of the vulcanizing agent may be used in the composition. They comprise a wide variety of basic nitrogen-containing organic compounds such as the condensation products of aliphatic aldehydes with aromatic amines or with ammonia, as well as guanidines and guanidine salts, aromatic polyamines, aliphatic polyamines, cinchona alkaloids, dihydroquinolines, and the like.

Although these vulcanizing agents are quite effective in reducing the thermoplasticity of the plasticized vinyl polymers, their use is attended with certain disadvantages. The vulcanized compositions have an undesirable odor, tend to be dark in color, and tend to deteriorate rapidly with age. I have now discovered that these disadvantages can be overcome by incorporating in the composition, together with the vulcanizing agents, a small amount of an organic compound containing a plurality of functionally hydroxyl groups. By the term "functionally hydroxyl group" I mean a hydroxyl group which does not form a part of another functional group, as it does, for example, in a carboxylic group. For the sake of convenience I have termed these compounds modifying agents. Although I have found that any organic compound containing a plurality of hydroxyl groups may be employed, best results are obtained with compounds which, except for the oxygen of the hydroxyl group, contain only carbon and hydrogen. Among the compounds which may be employed are ethylene glycol, diethylene glycol, propylene glycol, trimethylene glycol, glycerine, erythritol, arabitol, xylitol, mannitol, sorbitol, glucose, lactose, sucrose, cellulose, polyvinyl alcohol, triethanolamine, inositol, quinic acid; monoesters of glycerine with organic acids, such as the glycerine monoester of cottonseed fatty acid, stearic acid, palmitic acid, caprylic acid, or even acetic acid; hydroquinone, bromohydroquinone, chlorohydroquinone, 2,3-dimethyl hydroquinone, resorcinol, hexylresorcinol, pyrocatechol, phloroglucinol, gallic acid, pyrogallol, and the like.

The polymers with which my new modifying agents may be used include all of those with which the above-mentioned vulcanizing agents are effective, that is, with the polymers made by the polymerization of monomeric materials consisting predominantly of a halogenated ethylene in which from one to two halogen atoms are attached to one only of the carbon atoms. Although as little as 0.05% of my new modifying agent based upon the weight of the polymer may be effective, I have found that the best results are obtained by using from about one to about five percent or more. The amount and type of plasticizer employed in the composition is not critical, although, of course, the softness and resiliency of the stock depend to a large extent upon the particular plasticizer employed. In general, useful compositions may be secured by using from about 20 to 150 parts or more of plasticizer for each 100 parts of polymer. Any of the usual plasticizers may be employed, such as tricresyl phosphate, dibutyl phthalate, dioctyl phthalate, ditetrahydrofurfuryl sebacate, dicapryl phthalate, butyl phthalyl butyl glycollate, undecyl tetrahydronaphthyl ketone, cyclohexyl o-benzoylbenzoate, or the like.

The use of my new modifying agents serves not only to prevent deterioration of the vulcanized compositions and prevent the formation of undesirable color and odor, but serves also to increase greatly the ultimate elongation of the vulcanized compositions, and to increase their resistance to tear, especially at elevated temperatures. Vulcanized compositions made with my modifying agents also exhibit a remarkably increased flexibility at low temperature and increased resistance to organic solvents over similar compositions vulcanized without my modifying agents.

The modifying agent may be added together with the plasticizer and the vulcanizing agent to the polymer either on a hot roll mill or in an internal mixer, or the mixture of vulcanizing agent, plasticizer, and modifying agent may be added to an emulsion or solution of the polymer. If desired, the plasticizer may be first incorporated in the polymer and the vulcanizing agent and modifying agent added to the plasticized composition either together or separately. The composition may then be vulcanized in the usual manner by heating to an elevated temperature for a substantial period of time. Although the temperature and time of vulcanization vary with the amount and type of plasticizer employed, as well as with the type of polymer, best results are generally secured by heating the composition to a temperature of at least 300° F., preferably from about 320° to about 350° F. At these temperatures the time required for vulcanization varies from about 10 to about 100 minutes, depending upon the particular ingredients of the composition.

Any of the usual pigments, fillers, reinforcing agents, stabilizers or other materials commonly used in plasticized vinyl resin compositions may be employed in my new vulcanizable composition without deleterious effects.

The following examples are given merely for the purpose of illustrating the nature of my invention and are not to be construed as a limitation.

*Example I*

A plasticized polymer composition was prepared by mixing 100 parts by weight of high molecular weight polyvinyl chloride, 70 parts by weight of butyl phthalyl butyl glycollate, and five parts of magnesium oxide on a hot roll mill. To this composition there were added as vulcanizing agent three parts of the condensation product of butyraldehyde and aniline described by Alexander, U. S. Patent 2,117,591 issued May 17, 1938. Similar compositions were prepared, to which there were added, respectively, one part and three parts by weight of resorcinol. All three compositions were then vulcanized by heating in a press for 20 minutes at 340° F. The ultimate tensile strength of all three vulcanized compositions was about 1800 lbs. per sq. in. However, the ultimate elongation of the composition containing no modifying agent was only 200%, whereas the composition containing one part of resorcinol had an ultimate elongation of 310%, and the composition containing three parts of resorcinol had an elongation of 400%. Both of the compositions containing resorcinol had a much higher tear resistance than did the composition containing no resorcinol. The thermoplasticity of all three compositions was so greatly reduced that the product could be removed from the mold before cooling, but the latter two were much lighter in color than the first.

*Example II*

A series of compositions similar to those described in Example I was prepared, one containing no modifying agent, the second containing one part of glycerine, and the third containing three parts of glycerine. They were vulcanized by heating in a press for 30 minutes at 330° F. All three had an ultimate tensile strength of about 2,000 lbs. per sq. in. However, the ultimate elongations were 130, 240 and 400%, respectively. The tear resistance of the latter two compositions was very much higher than that of the composition containing no modifying agent and whereas the former composition was dark-colored and possessed an undesirable odor, the latter two were almost free from color and free from odor. The latter two compositions also retained their flexibility at much lower temperatures than did the former.

*Example III*

Three compositions similar to those of Example I were prepared; the first containing no modifying agent; the second containing one part of hydroquinone; and the third containing three parts of hydroquinone. After vulcanization for 30 minutes at 330° F., all three compositions had an ultimate tensile strength of about 2100 lbs. per sq. in. The ultimate elongation of the first composition, however, was only 210%, whereas that of the second was 300%, and that of the third was 350%. The latter two compositions were free from the undesirable color and odor found in the first, and also possessed a higher tear resistance than did the first.

*Example IV*

A composition containing 100 parts by weight of high molecular weight polyvinyl chloride, 70 parts of butyl phthalyl butyl glycollate, 5 parts of the condensation product of butyraldehyde and aniline, and 5 parts of magnesium oxide, was prepared as described in Example I. To one portion of this composition there were added five parts of sorbitol. The two compositions were then vulcanized by heating in a press for 30 minutes at 330° F. and their physical properties were then determined. The ultimate tensile strength of each was about the same, but the ultimate elongation of the composition containing no modifying agent was only 130%, whereas that of the composition containing sorbitol was 300%. The color, odor, tear resistance, and low-temperature flexibility of the composition containing the modifying agent were also much superior to those of the composition containing no modifying agent.

The thermoplasticity of all of the compositions described in the preceding specific examples was reduced to such an extent by the vulcanization process that all of the compositions could readily be removed from the hot mold. When no vulcanizing agent is employed, and the composition is molded under similar conditions, it is impossible to remove the product from the mold without first cooling it almost to room temperature. Similar results can be obtained using other vulcanizing agents of the class described and organic compounds containing two or more hydroxyl groups. It should be noted that the magnesium oxide pigment used in these examples is not an essential ingredient of the composition; it may be replaced by other suitable pigments or may be omitted entirely.

These new vulcanized compositions are useful for not only all the purposes to which the vulcanized plasticized vinyl resin compositions heretofore known have been put, but they are particularly valuable because of their high elongation, their high tear resistance, their resistance to solvents, and their flexibility at low temperatures.

Although I have herein described specific embodiments of my invention, I do not intend to restrict myself solely thereto, but to include all of the modifications embraced within the spirit and scope of the appended claims.

I claim:

1. The process of vulcanizing a plasticized polymer composition having as a base a polymer prepared by the polymerization of a monomeric material comprising predominantly a halogenated ethylene containing from one to two halogen atoms on one only of the carbon atoms, which comprises incorporating in said composition from 0.5 to 10% by weight based on the polymer of a condensation product of butyraldehyde and aniline, and from 0.05 to 5% by weight based on the polymer of an organic compound composed exclusively of a hydrocarbon radical containing from 2 to 6 carbon atoms and a plurality of hydroxyl groups attached to different carbon atoms, and then heating the resulting composition at a temperature of 300 to 350° F. for a time of 10 to 100 minutes.

2. A vulcanized composition prepared by the method of claim 1.

3. The process of claim 1 wherein the organic compound composed exclusively of a hydrocarbon radical and a plurality of attached hydroxyl groups is glycerine.

4. A vulcanized composition prepared by the method of claim 3.

5. The process of claim 1 wherein the organic compound composed exclusively of a hydrocarbon radical and a plurality of attached hydroxyl groups is a polyhydroxy benzene.

6. A vulcanized composition prepared by the method of claim 5.

7. The process of claim 1 wherein the plasticized polymer composition is one having as a base polyvinyl chloride.

8. A vulcanized composition prepared by the method of claim 7.

9. The process of vulcanizing a plasticized polymer composition having as a base a polymer prepared by the polymerization of a monomeric material comprising predominantly a halogenated ethylene containing from 1 to 2 halogen atoms on one only of the carbon atoms, which comprises incorporating in said composition from 0.5 to 10% by weight based on the polymer of a basic nitrogen-containing organic compound selected from the class consisting of condensation products of aliphatic aldehydes with aromatic amines and condensation products of aliphatic aldehydes with ammonia, and from 0.05 to 5% by weight based on the polymer of an organic compound composed exclusively of a hydrocarbon radical containing from 2 to 6 carbon atoms and a plurality of hydroxyl groups attached to different carbon atoms, and then heating the resulting composition at a temperature of 300 to 350° F. for a time of 10 to 100 minutes.

10. A vulcanized composition prepared by the process of claim 9.

LOUIS F. REUTER.

REFERENCES CITED

The following references are of record in the file of this patent:

UNITED STATES PATENTS

| Number | Name | Date |
| --- | --- | --- |
| 2,117,591 | Alexander | May 17, 1938 |
| 2,103,581 | Gray | Dec. 28, 1937 |